F. P. McCOLL.
SOLDERING MACHINE.
APPLICATION FILED DEC. 17, 1910.
1,103,067.
Patented July 14, 1914.
2 SHEETS—SHEET 1.
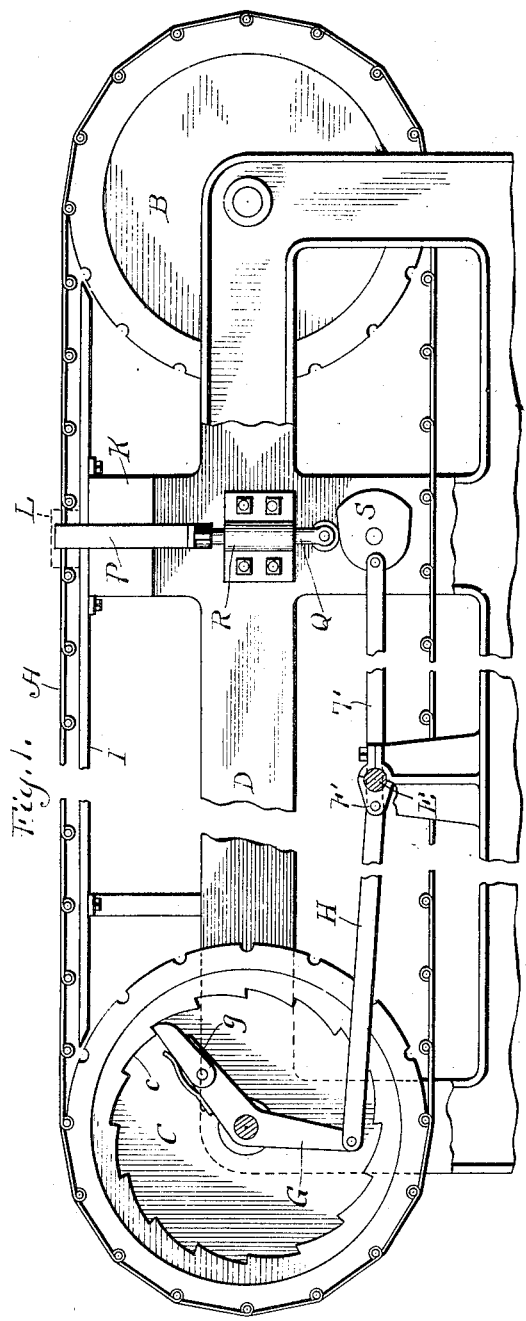
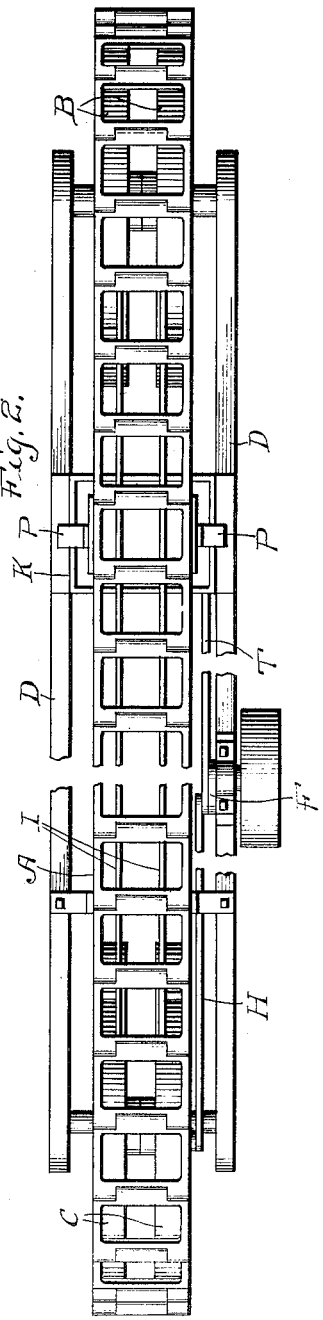

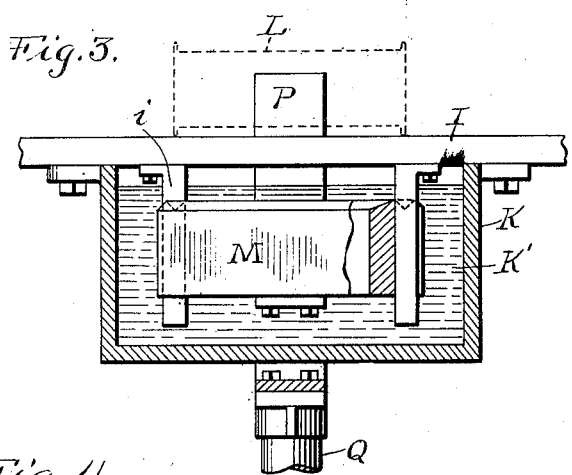
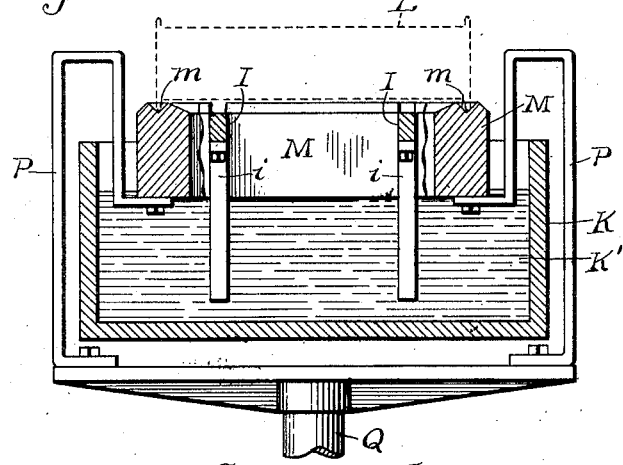
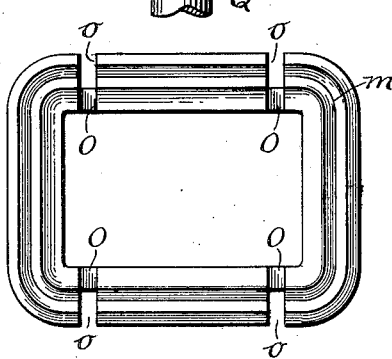
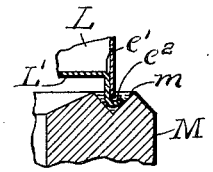

UNITED STATES PATENT OFFICE.

FRANCIS P. McCOLL, OF ST. ANDREWS, NEW BRUNSWICK, CANADA, ASSIGNOR TO AMERICAN KEY CAN COMPANY, OF CHICAGO, ILLINOIS, A CORPORATION OF NEW JERSEY.

SOLDERING-MACHINE.

1,103,067.  Specification of Letters Patent.  Patented July 14, 1914.

Application filed December 17, 1910. Serial No. 597,793.

*To all whom it may concern:*

Be it known that I, FRANCIS P. McCOLL, a citizen of the United States, residing at St. Andrews, county of Charlotte, State of New Brunswick, Canada, have invented a certain new and useful Improvement in Soldering-Machines, and declare the following to be a full, clear, and exact description of the same, such as will enable others skilled in the art to which it pertains to make and use the same, reference being had to the accompanying drawings, which form a part of this specification.

My invention relates to the art of soldering and especially to soldering the ends or heads to can bodies; and it has for one of its objects to provide a simple and efficient machine which will insure a perfect soldered joint with a minimum amount of solder.
A further object of my invention is to produce a soldering machine which will insure uniformity in the joints of cans operated upon thereby.

A further object of my invention is to produce a machine in which the end or head of a filled can may be effectively soldered without heating the contents of the can to such an extent as to give rise to an internal pressure sufficient to produce leaks in the soldered joint.

The various features of novelty whereby my invention is characterized will hereinafter be pointed out with particularity in the claims; but for a full understanding of my invention, of its objects, including those enumerated and others, and of its advantages, reference may be had to the following detailed description taken in connection with the accompanying drawings, wherein:
Figure 1 is a side elevation of a machine arranged in accordance with one form of my invention, portions being broken away in order more clearly to show parts normally concealed; Fig. 2 is a top plan view of the machine shown in Fig. 1; Fig. 3 is a vertical longitudinal section on an enlarged scale through the solder pot; Fig. 4 is a section taken at right angles to the plane of Fig. 3, Fig. 3 showing the soldering iron lowered and Fig. 4 showing it raised; Fig. 5 is a top view of the soldering iron; and Fig. 6 shows a fragment of the soldering iron in operative soldering relation to a fragment of a can to be soldered.
In accordance with my invention I provide means for separating from a bath of molten solder measured quantities just sufficient to effect the soldering of a joint, and bringing such measured quantities into contact with the parts to be soldered together. In this way, the amount of solder necessary for producing a tight joint having been ascertained, any desired number of joints may be made one after the other without wasting any solder and with the assurance that all of the joints will be perfect. When the joints are properly fluxed, the solder will of course follow the flux and therefore, since there is no excess of solder, it is impossible for any creeping to take place over the surfaces of the parts to be soldered beyond the joints. This is an advantage in soldering cans because it not only saves solder but it also serves to preserve the appearance of the cans by leaving them clean beyond the joints. By designing cans properly, their heads may be soldered in place after the cans have been filled without heating the contents, because just the proper amount of solder is supplied at the points where it is needed. I prefer to measure the solder and apply it to the joints to be soldered by means of a soldering iron which is normally submerged in a bath of molten solder and which is so constructed and arranged that, when lifted from the solder, it will carry with it the small quantity of solder required for a single joint; this measured quantity of solder being so located upon the iron that the entire joint will be soldered by a single operation when the iron is brought in proper relation to the joint. In this way the soldering iron is always kept hot by being submerged in the molten solder, the iron when brought into operative relation to the can being hot enough to solder the joint successfully.

It will of course be understood that the various structural details of the apparatus in which my invention is embodied may be widely varied. For the sake of brevity I have shown only one form of apparatus and shall confine the detailed description to this one form, since this will explain my invention with sufficient clearness to permit it to be practised successfully.

Referring to the drawings which disclose a machine in which cans are adapted to be fed intermittently and to be soldered while they remain at rest, A represents a suitable can carrier, illustrated as being of the endless type passing over wheels or pulleys B and C.

D represents the framework as a whole, this framework of course taking any suitable form. The means for driving the carrier is illustrated as consisting of a shaft E having a crank F which is connected to a driving lever G by means of a connecting rod H.

The lever G has a pawl $g$ which engages with internal ratchet teeth $c$ on the member C. It will be seen that during half a revolution of the driving shaft the wheel C, and therefore the can carrier, will remain stationary, while during the other half of the same revolution the wheel C, and therefore the can carrier, will be driven forward one step.

I represents a pair of tracks lying beneath the upper portion of the can carrier, the cans being adapted to rest upon the tracks and to be moved along the same by means of the carrier.

K is a pot for containing a solder bath, this pot being located directly beneath the tracks at such a point along the same that during the time the can carrier is at rest there will be one can, as indicated at L in Fig. 1, which rests directly above the bath.

In accordance with the preferred form of my invention I make use of a soldering iron M which is normally submerged in the solder K' and is mounted so that it may be moved vertically into engagement with the can lying above the bath.

The machine illustrated is designed for soldering heads into rectangular sardine cans and therefore I have made the soldering iron in the form of a frame having a rectangular shape. Where it is desired to solder cans of other shapes the soldering iron will of course be correspondingly changed. In the top of the soldering iron is an annular groove or channel $m$ which has the same configuration as the bottom edge of the can. It will be seen that when the soldering iron is lifted into engagement with the can, the joint around the bottom of the latter will enter the channel in the iron. By making the channel just large enough to contain the amount of solder required to produce a tight joint, this proper amount of solder will be carried to the can whenever the soldering iron is lifted out of the bath. Not only will there always be just the proper amount of solder present during the soldering operation, but this solder will in every case be fresh and clean because the channel is filled at a point below the surface of the solder in the bath where the solder is in perfect condition and this solder is retained in the channel as the iron is lifted out of the bath. Where the can above the solder is supported from beneath by tracks, as illustrated in the drawing, it is necessary to make provision for permitting the iron to pass up beyond the tracks in order to reach the joint. This may conveniently be accomplished by cutting grooves O across the top of the iron in such positions that when the iron is raised the tracks will enter the grooves and will permit the iron to rise to any desired height. Since the iron is always hot and the solder in the channel quite fluid, some of the solder would run out of the open ends of the channel where the same is intersected by the grooves before the tracks entered the grooves and acted as barriers, unless some means were provided for closing the ends of the channel during the time the top of the soldering iron lies below the bottom of the tracks. To prevent escape of the solder from the channel in the manner just explained, I arrange upon the tracks depending fingers $i$ which lie in vertical grooves $o$ in the sides of the iron. The grooves $o$ are made deep enough, measured in the direction of the tracks, to make them extend across the open ends of the channels, and the fingers $i$ are made wide enough to fill the vertical grooves. As soon as the top of the soldering iron rises above the upper surfaces of the tracks, a can being in position on the tracks above the iron, the fluxed joint enters the channel and the solder which tends to flow out of the open ends of the channel follows along the joint in the can. In other words the solder will flow along the joint across the gaps in the channel instead of running back into the bath. Consequently the fingers serve as barriers at the open ends of the channel while the soldering iron is rising out of the solder toward the can. The fingers serve a second purpose: that of guides which determine the path of travel of the soldering iron and therefore insure that it will always rise to a position where the channel will register with the joint in the can.

In order to make the machine automatic it is only necessary to provide some means for raising the soldering iron while the carrier remains stationary and for lowering it into the bath while the carrier is moving. This may conveniently be accomplished by connecting the soldering iron to a yoke P which is carried upon the upper end of a vertically movable shaft Q mounted in a suitable bearing R on the frame of the machine; providing a cam S for engaging with the lower end of the rod so as alternately to raise and lower the same; and driving the cam from the crank F by means of a connecting rod T; the parts being so adjusted that the cam permits the soldering iron to descend into the bath while the carrier is moving and raises the iron and holds it raised long enough to complete the soldering operation while the carrier remains stationary.

While my invention may be employed for soldering joints of any kind, it is particularly valuable for soldering the heads into cans of the type shown most clearly in Fig. 6, L being the can having a cup-shaped head L' which is pressed into the open end of the can with its mouth directly outwardly. The flux will be placed upon the flange e' of the head and the narrow band of the can body which engages with this flange. It will be seen that only a portion of the flange on the head and of the engaging part of the can body will enter the channel in the iron so that the portions of the can body and of the head which come in contact with the contents, assuming the can to be filled, do not touch the soldering iron and therefore there can be no heating of the contents, no rise of pressure within the can, and no blowing out of solder because of internal pressure. This arrangement also has advantages where heads are being soldered into empty cans because the heads and the sides of the cans may be decorated without danger of burning the decorations during the soldering operation. The starting of the flow of solder into the joint may be facilitated by bending the extreme edge of the flange on the head so as to form a small fin $e^2$ which projects outwardly beyond the can body. The solder follows the flux upon the top of the fin and therefore enters readily into the space between the can body and the flange.

While I have illustrated and described with particularity only a single form of my invention I do not desire to be limited to the specific details so illustrated and described; but intend covering all constructions and arrangements which fall within the terms employed in the definitions of my invention constituting the appended claims.

What I claim is:

1. In a soldering machine, a solder bath, a track lying above the bath for supporting a can, a soldering iron within said bath having in its upper face a channel of the same configuration as the bottom edge of the can, means for raising and lowering the iron so as to move it between a position wherein it is submerged to a position wherein the bottom edge of the can lies in said channel, said iron having a groove across the same to receive the track so as to permit the upper surface of the iron to pass the track.

2. In a soldering machine, a solder bath, a track lying above the bath for supporting a can, a soldering iron within said bath having in its upper face a channel of the same configuration as the bottom edge of the can, means for raising and lowering the iron so as to move it from a position wherein it is submerged to a position wherein the bottom edge of the can lies in said channel, said iron having a groove across the same to receive the track so as to permit the upper surface of the iron to pass the track and means for closing the ends of the channel where they are intersected by the said groove while the upper surface of the iron lies below the track.

3. In a soldering machine, a solder bath, a track lying above the bath for supporting a can, a soldering iron within said bath having at the top thereof a soldering portion of the same configuration as the bottom edge of the can, means for raising and lowering the iron so as to move it between a position wherein it is submerged and a position wherein said soldering portion is in operative relation to the bottom edge of the can, said iron having a groove across the same to receive the track so as to permit the said soldering portion to rise to or above the top of the track, and means for guiding the iron in the vertical direction.

4. In a soldering machine, a solder bath, a track lying above the bath for supporting a can, a soldering iron within said bath having in its upper face an annular channel of the same configuration as the bottom edge of the can, means for raising and lowering the iron so as to move it between a position wherein it is submerged and a position wherein the bottom edge of the can lies in said channel, said iron having a groove across the same to receive the track so as to permit the upper surface of the iron to pass the track, said iron having vertical grooves extending from the track receiving groove, said vertical grooves having a depth measured lengthwise of the track sufficient to carry them across the adjacent ends of the solder-receiving channel, and members projecting from said track and fitting into said vertical grooves so as to guide the iron and at the same time close the ends of the solder-containing channel while the top of the iron lies below the top of the track.

5. In a soldering machine, a solder bath, a track lying above the bath for supporting a part to be soldered, means for moving a part to be soldered along said track, a soldering iron having a solder-containing channel, and means for moving said iron between a position in which the channel is submerged in the bath and a position wherein said channel is in operative relation to the part to be soldered, said iron having a groove cut across said channel and registering with the track so as to permit the top of the iron to be raised above the top of the track.

6. In a soldering machine, a solder bath, a track lying above the bath for supporting a part to be soldered, means for moving a part to be soldered along said track, a soldering iron having a solder-containing channel, and means for moving said iron between a position in which the channel is submerged in the bath and a position wherein said channel is in operative relation to the part to be soldered, said iron having a groove cut across said channel and registering with the track so as to permit the top of the iron to be raised above the top of the track, and a combined guide for the iron and closure for said groove extending down from the track into said groove.

In testimony whereof, I sign this specification in the presence of two witnesses.

FRANCIS P. McCOLL.

Witnesses:
SARA H. KANE,
JESSIE M. PEABODY.